United States Patent
Zhang et al.

(10) Patent No.: US 7,720,147 B2
(45) Date of Patent: May 18, 2010

(54) METHOD AND SYSTEM FOR PROVIDING A HIGH SPEED MULTI-STREAM MPEG PROCESSOR

(75) Inventors: Weimin Zhang, San Jose, CA (US);
Binfan Liu, Livermore, CA (US);
Zhongqiang Wang, San Jose, CA (US)

(73) Assignee: BroadLogic Network Technologies, Inc., San Jose, CA (US)

( * ) Notice: Subject to any disclaimer, the term of this patent is extended or adjusted under 35 U.S.C. 154(b) by 1251 days.

(21) Appl. No.: 10/888,551

(22) Filed: Jul. 9, 2004

(65) Prior Publication Data
US 2005/0031042 A1 Feb. 10, 2005

Related U.S. Application Data

(60) Provisional application No. 60/486,030, filed on Jul. 9, 2003.

(51) Int. Cl.
*H04N 7/12* (2006.01)
(52) U.S. Cl. .............. 375/240.12; 375/240.25
(58) Field of Classification Search ............. 375/240.12
See application file for complete search history.

(56) References Cited

U.S. PATENT DOCUMENTS

| | | | |
|---|---|---|---|
| 5,504,823 A | | 4/1996 | Yoon |
| 5,566,089 A | * | 10/1996 | Hoogenboom ............. 358/1.15 |
| 5,751,741 A | * | 5/1998 | Voith et al. ................... 714/758 |
| 5,764,293 A | * | 6/1998 | Uz et al. .................. 348/390.1 |
| 5,969,768 A | | 10/1999 | Boyce et al. |
| 5,978,509 A | | 11/1999 | Nachtergaele et al. |
| 6,088,047 A | | 7/2000 | Bose et al. |
| 6,141,059 A | | 10/2000 | Boyce et al. |
| 6,215,822 B1 | | 4/2001 | Bose et al. |
| 6,256,045 B1 | * | 7/2001 | Bae et al. ..................... 348/445 |
| 6,519,286 B1 | | 2/2003 | Porter et al. |
| 6,922,739 B2 | * | 7/2005 | Core ........................... 710/22 |

(Continued)

OTHER PUBLICATIONS

WM Action Group, Mpeg-4 Video Verification Model Version 1.0, Jan. 1996, International Organisation for Standardisation Organisation internationale de Normalisation: Coding of Moving Pictures and Associated Audio Information, ISO/IRRC JTC1/SC29/WG11 MPEG96/N1172, pp. 1-49.*

(Continued)

*Primary Examiner*—Tung Vo
*Assistant Examiner*—Anner Holder
(74) *Attorney, Agent, or Firm*—Townsend and Townsend and Crew LLP

(57) ABSTRACT

An MPEG processor is provided. According to one aspect of the processor, multiple MPEG data streams for corresponding channels are individually stored in an off-chip memory. Corresponding data for a channel is then retrieved from the off-chip memory for processing. The retrieved data is then decoded. The decoded results and associated information are stored on the off-chip memory. Some or all of the associated information that can be used for decoding subsequent data is stored in an on-chip memory. When video images need to be displayed, the corresponding data that is needed for that purpose is then retrieved from the off-chip memory and provided to an analog encoder for encoding in a format that is compatible with an analog display device.

65 Claims, 2 Drawing Sheets

U.S. PATENT DOCUMENTS

| | | | |
|---|---|---|---|
| 7,039,114 B2 * | 5/2006 | Honmura et al. | 375/240.25 |
| 2001/0033736 A1 * | 10/2001 | Yap et al. | 386/46 |
| 2002/0106018 A1 | 8/2002 | D'Luna et al. | |

OTHER PUBLICATIONS

Supplementary European Search Report of Nov. 20, 2007 for European application 04777978-1247.

Fujii, Y., et al., Implementation of MPEG Transport Demultiplexer with a RISC-Based Microcontroller, Aug. 1996, *IEEE Transactions on Consumer Electronics*, IEEE Service Center, New York, NY, vol. 42, No. 3, pp. 431-438.

Office Action of Feb. 23, 2009 for EP application No. EP04777978.0.

First Office Action of Nov. 17, 2006 for Chinese Application No. 200480019469.4, 22 pages Second Office Action of Jul. 20, 2007 for Chinese Application No. 200480019469.4, 15 pages.

First Examination Report of Oct. 4, 2007 for Indian Application No. 491/CHENP/2006, 3 pages.

International Search Report and Written Opinion of Mar. 2, 2005 for PCT Application No. PCT/US2004/022228, 8 pages.

* cited by examiner

METHOD AND SYSTEM FOR PROVIDING A HIGH SPEED MULTI-STREAM MPEG PROCESSOR

CROSS-REFERENCES TO RELATED APPLICATIONS

The present application claims the benefit of priority under 35 U.S.C. § 119 from U.S. Provisional Patent Application Ser. No. 60/486,030, filed Jul. 9, 2003, entitled "METHOD AND SYSTEM FOR PROVIDING A HIGH SPEED MULTI-STREAM MPEG DECODER", by WeiMin Zhang, the disclosure of which is hereby incorporated by reference in its entirety for all purposes as if set forth in full herein.

BACKGROUND OF THE INVENTION

The present invention generally relates to a chip architecture for a multi-stream video processor and more specifically to a high speed multi-stream MPEG decoder.

A video stream is traditionally compressed into certain types of MPEG streams to facilitate transmission. The name MPEG is an acronym for Moving Picture Experts Group. The MPEG standards cover the coding of video data, such as moving pictures or images, and the associated audio data and their synchronization, including multiple and interleaved video sequences. For example, most of the set top boxes today utilize the MPEG-2 video format. MPEG video is highly compressed compared with analog video format, such as NTSC or PAL.

MPEG-2 video sequences are made up of three different types of picture frames, namely, I-frame, P-frame and B-frame. FIG. 1 is a simplified schematic diagram showing a typical MPEG-2 code frame sequence. I-frames are intra-coded frames which are coded independently without reference to other frames. I-frames provide access points to the coded video sequence at which decoding can begin. I-frames, however, are only moderately compressed. The other two frame types, P-frame and B-frame, are inter- or non-intra coded. P-frames are predictively coded frames, meaning that such frames are coded using motion compensation with reference to previous I- or P-frames. P-frames are coded more efficiently than I-frames. B-frames are bi-directional predictively coded frames. B-frames are coded using motion compensation with reference to past and future I-or P-frames in the video sequence and are highly compressed.

Traditionally, an MPEG decoder is used to decode the MPEG-2 video frame sequences. The decoded sequences are then forwarded directly to an analog encoder. The analog encoder then provides the compatible signals to allow an analog display device, such as, a television to display the corresponding video and audio data. An analog display device typically generates video images by reproducing scanned lines within a field in an alternate manner. In other words, the even numbered lines are reproduced first and the odd numbered lines second, or vice versa. The results are then interlaced to produce the video images.

If the MPEG-2 video frame sequences are processed in a sequential manner and there is a relatively limited number of incoming data streams, memory requirements do not present too much of a problem in the foregoing arrangement. However, as the number of incoming data streams increases, the amount of memory that is needed to facilitate processing of the MPEG-2 video frame sequences becomes a serious bottleneck thereby adversely affecting the efficiency of a system.

Hence, it would be desirable to provide an improved MPEG decoder that is capable of handling video processing in a more efficient manner.

BRIEF SUMMARY OF THE INVENTION

An MPEG processor is provided. According to one aspect of the processor, multiple MPEG data streams for corresponding channels are individually stored in an off-chip memory. Corresponding data for a channel is then retrieved from the off-chip memory for processing. The retrieved data is then decoded. The decoded results and associated information are stored on the off-chip memory. Some or all of the associated information that can be used for decoding subsequent data is stored in an on-chip memory. When video images need to be displayed, the corresponding data that is needed for that purpose is then retrieved from the off-chip memory and provided to an analog encoder for encoding in a format that is compatible with an analog display device.

In one embodiment, the MPEG processor includes a video transport engine configured to receive MPEG data from a number of channels and forward the MPEG data to an off-chip memory for storage; an on-chip memory; control logic configured to retrieve data for a channel from the off-chip memory; a decoder configured to decode the retrieved data and generate decoded data and associated information; control logic configured to forward the decoded data and associated information to the off-chip memory and store some or all of the associated information in the on-chip memory; and control logic configured to retrieve the some or all of the associated information stored in the on-chip memory and forward the some or all of the associated information to the decoder for use in subsequent decoding. The MPEG processor further includes control logic configured to retrieve the decoded data and associated information from the off-chip memory; and an encoder configured to generate encoded results using the decoded data and associated information retrieved from the off-chip memory; wherein the encoded results are suitable for use by an analog display device.

Reference to the remaining portions of the specification, including the drawings and claims, will realize other features and advantages of the present invention. Further features and advantages of the present invention, as well as the structure and operation of various embodiments of the present invention, are described in detail below with respect to accompanying drawings, like reference numbers indicate identical or functionally similar elements.

DETAILED DESCRIPTION OF THE INVENTION

Figure 1:
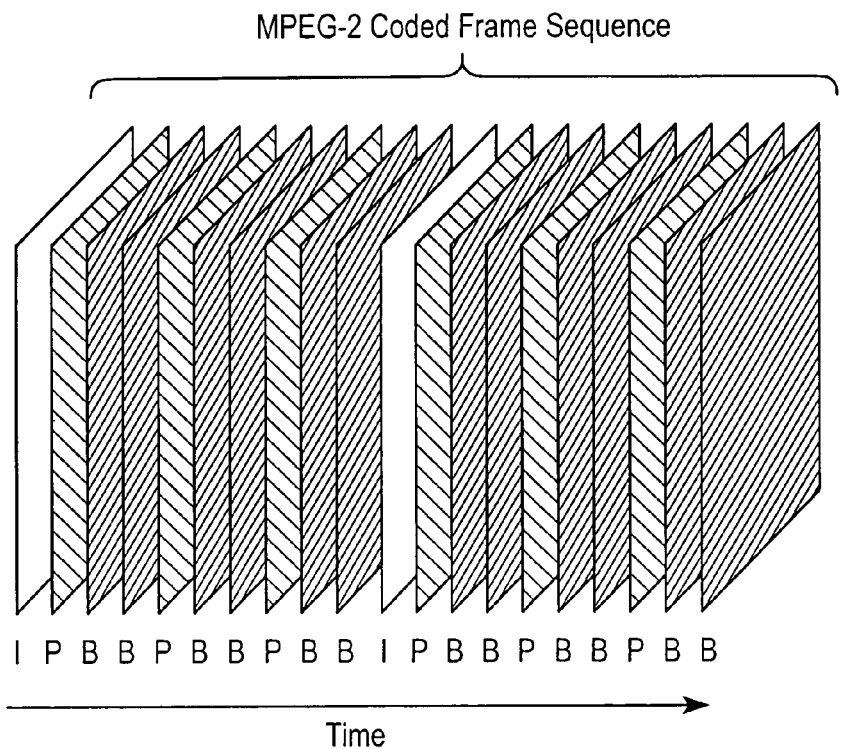
FIG. 1 is a simplified schematic diagram showing a typical MPEG-2 code frame sequence.
Figure 2:
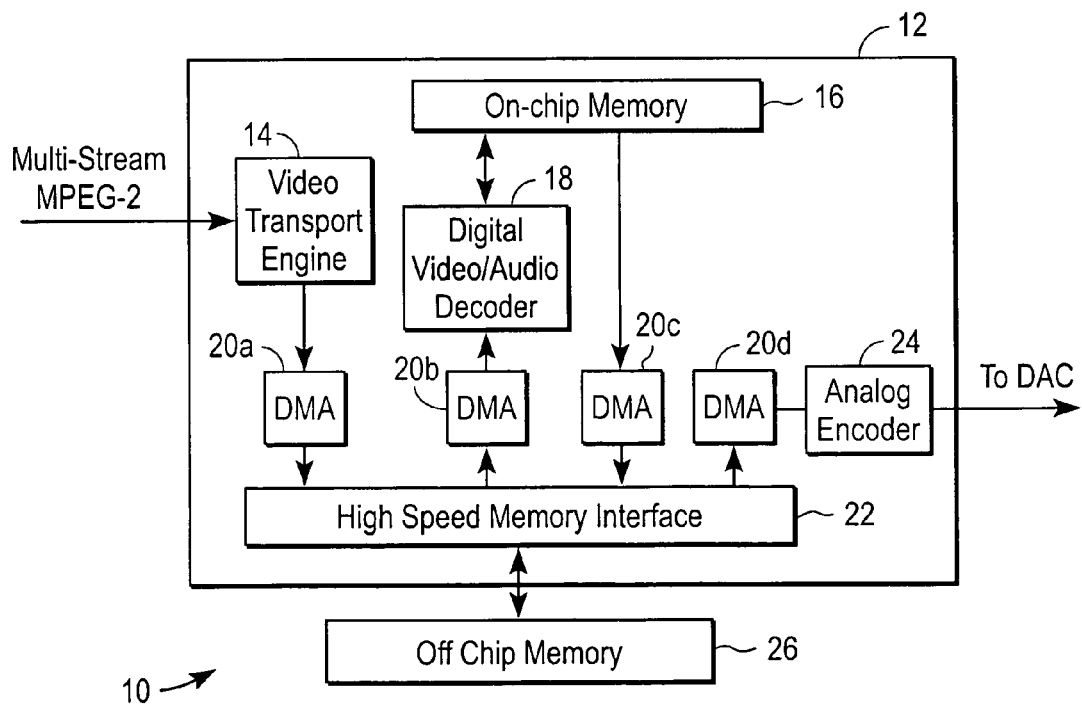
FIG. 2 is a simplified schematic block diagram illustrating a first exemplary embodiment of the present invention.

The present invention in the form of one or more exemplary embodiments will now be described. According to one exemplary embodiment of the present invention, an improved chip architecture is provided for MPEG-2 video decoding of multi-stream video data. FIG. 2 is a simplified schematic block diagram illustrating a first exemplary embodiment of a system in accordance with the present invention. In this exemplary embodiment, the system 10 is made up of a number of components including a processing module 12 and an off-chip memory 26. The processing module 12 further includes a video transport engine 14, an on-chip memory 16, a digital video/audio decoder 18, a number of direct access memories 20*a*-*d*, a memory interface 22, an analog encoder 24 and control logic controlling operations amongst the various components. In one implementation, the processing module 12 are built on an integrated circuit chip. Based on the disclosure and teachings provided herein, a person of ordinary skill in the art will appreciate other ways and/or methods to implement the present invention.

The system 10 processes multiple MPEG-2 data streams from various channels in the following exemplary manner. The multiple data streams are received by the video transport engine 14. The video transport engine 14 processes the multiple data streams by first storing the corresponding data stream(s) for each channel into the direct access memory 20*a*. It should be understood that each channel may be associated with one or more data streams. For example, a channel may have one video stream with corresponding audio stream(s) and/or other related stream(s). Data from the direct access memory 20*a* is then offloaded onto the off-chip memory 26 for storage via the memory interface 22. When sufficient data has been stored for a channel for further processing, the corresponding data for that channel is read out from the off-chip memory 26. Data from the off-chip memory 26 is stored in the direct access memory 20*b* for subsequent processing by the digital video/audio decoder 18. The decoder 18 processes data one channel at a time, as will be further described below. In one embodiment, the decoder 18 is able to process data for a channel in parallel.

Figure 4:
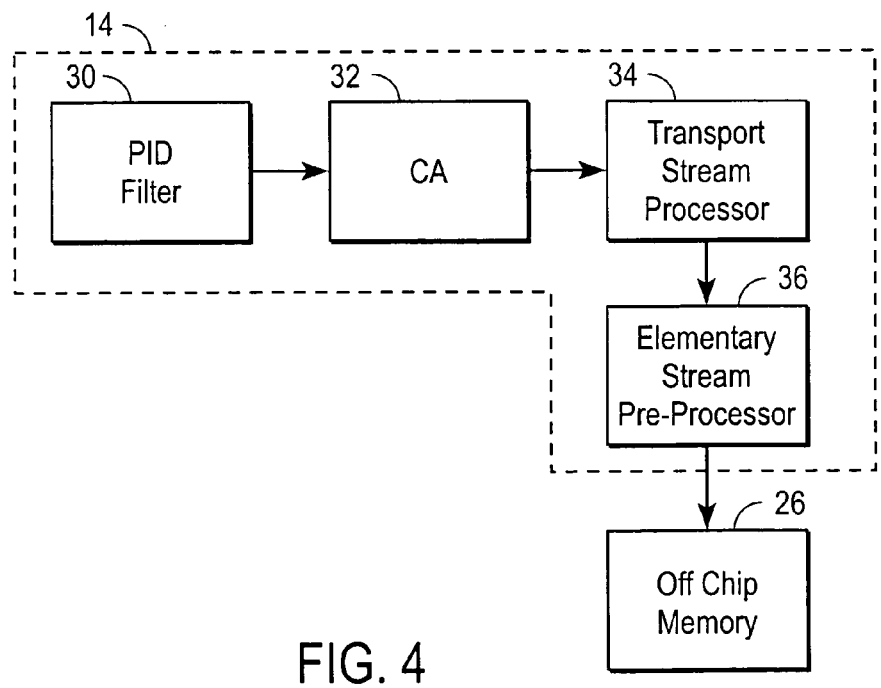
FIG. 4 is a simplified schematic block diagram illustrating an embodiment of a video transport engine according to the present invention.

FIG. 4 is a simplified schematic block diagram illustrating an embodiment of the video transport engine 14. Referring to FIG. 4, the video transport engine 14 includes a packet ID (PID) filter 30, a conditional access module 32, a transport stream processor 34 and an elementary stream pre-processor 36.

The PID filter 30 receives multiple data streams corresponding to different channels or programs. In one embodiment, a data stream is made up of packets. Each packet is 188×8 bits and has a packet ID. Where the size of a macro-block is relatively large, (e.g., exceeding the size of a packet), a number of packets may make up a macro-block; where the size of a macro-block is relatively small, a packet may include multiple macro-blocks. The PID filter 30 reads the packet ID of each packet and provides the correct memory address in the off-chip memory 26 for that packet.

The packets and their associated memory addresses are then forwarded to the conditional access module 32. The conditional access module 32 is able to receive and process packets from multiple data streams and controls access conditions with respect to the packets. For example, packets that are not to be processed due to certain access conditions are removed by the conditional access module 32.

Output from the conditional access module 32 is then forwarded to the transport stream processor 34. The transport stream processor 34 is able to handle and process packets belonging to different data streams. One of the functions of the transport stream processor 34 is to remove transport stream headers and other system information from the packets.

Output from the transport stream processor 34 is then provided to the elementary stream processor 36. The elementary stream pre-processor 36 is able to handle and process packets belonging to either a single data stream or multiple data streams. The elementary stream pre-processor 36 is further able to process packets or macro-blocks in parallel. One of the functions of the elementary stream pre-processor 36 is to identify all the headers in the packets including, for example, macro-block header, frame header and slice header, etc., before the packets are written onto the off-chip memory 26. By identifying these headers, multiple macro-blocks and/or slices can be processed at the same time by the decoder 18.

MPEG-2 video frames are generally organized in groups of PBB frames delimited by I-frames. There are two ways to decode the MPEG-2 video frames. One way to decode the MPEG-2 video frames is as follows. For an I-frame, since no reference frame is needed, the I-frame is processed by the decoder 18. The results generated by the decoder 18 include decoded data and associated information which includes information that can be subsequently used for decoding other frames. The decoded data and associated information are stored in the off-chip memory 26 and some or all of the associated information is stored in the on-chip memory 16 to allow easy access and expedite the decoding process. In other words, data stored in the on-chip memory 16 is used to facilitate decoding of other frames and data stored in the off-chip memory 26 is used subsequently for display purposes.

For a P-frame, a previous P-frame or an I-frame is needed as a reference frame. The on-chip memory 16 is checked to determine whether the information related to the associated reference frame is available. If such information is not available from the on-chip memory 16, it is retrieved from the off-chip memory 26. The retrieved information is then stored into the on-chip memory 16 for subsequent use. The P-frame is then processed by the decoder 18 using information related to the associated reference frame. Similarly, the results generated by the decoder 18 include decoded data and associated information for the P-frame. The decoded data and associated information for the P-frame are stored in the off-chip memory 26 and some or all of the associated information related to the P-frame is also stored into the on-chip memory 16 for subsequent P- or B-frame decoding.

After one or more I-frames and/or P-frames are processed, all associated B-frames are then processed by the decoder 18 using that the one or more I-frames and/or P-frames as references. As previously described, information related to the one or more I-frames and/or P-frames is stored in the on-chip memory 16 and such information is readily accessible to the decoder 18. The results are then written to the off-chip memory 26 for use in connection with future display.

After each group of PBB frames is processed, data for the next channel is retrieved from the off-chip memory 26 for processing (assuming that there is sufficient data for processing). The foregoing process is then repeated for all the channels.

A second way to decode the MPEG-2 video frames is to process a fixed number, n, of frames before a channel is switched, regardless of whether the last processed frame is an I-frame, a P-frame, or a B-frame. n could be 2, 3, 4 or any other integer. Before the decoding process begins, information related to a reference frame that has been previously stored is first retrieved from the off-chip memory 26 for the channel to be processed and loaded into the on-chip memory 16. The reference frame information is then subsequently used during the decoding process for decoding frames. Other associated reference frames are recovered using the retrieved reference frame, if necessary. The I-, P-, and B-frames are then processed the same way as described above. Before switching channel, a reference frame is chosen and stored in the off-chip memory 14 to be used as a reference point next time the same channel is to be processed. By using the off-chip memory 26 to store information related to the reference frames, data throughput of the processing module 12 is improved.

When video images are needed for display, the corresponding data is then retrieved from the off-chip memory 26 and passed to the analog encoder 24 for encoding in a format that is compatible with an analog display device. Output from the analog encoder 24 is then passed to a digital-to-analogy converter (not shown) for conversion to analog signals that are suitable for use with the analog display device.

Figure 3:
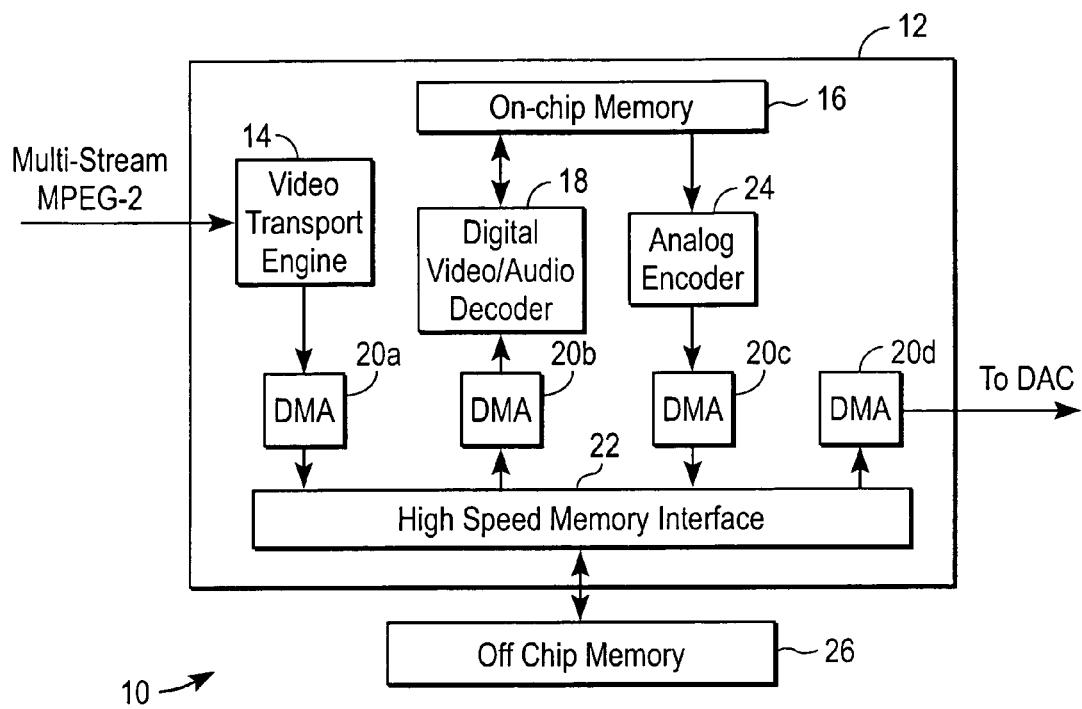
FIG. 3 is a simplified schematic block diagram illustrating a second exemplary embodiment of the present invention.

FIG. 3 is a simplified schematic block diagram illustrating a second embodiment of the system in accordance with the present invention. In this embodiment, the data needed for subsequent display is forwarded to the analog encoder 24 for processing. Output from the analog encoder 24 is then stored in the off-chip memory 26. When video images are needed for display, the corresponding analog encoder output is retrieved from the off-chip memory 26 and passed to a digital-to-analogy converter (not shown) for conversion to analog signals that are suitable for use with an analog display device. In this embodiment, by storing output from the analog encoder 24 in the off-chip memory 26, memory throughput of the processing module 12 is improved.

As described above, the off-chip memory 26 can be used for various purposes including, for example, as a buffer for MPEG data streams and a buffer for processed frames.

In one exemplary application, the present invention is deployed in a set top box or signal gateway configured to receive signals from a cable head end. Based on the disclosure and teachings provided herein, a person of ordinary skill in the art will appreciate other ways and/or methods to deploy the present invention.

It should be understood that while the foregoing description is provided in terms of the MPEG standards, the present invention can similarly be applied to other video standards as well, such as, MPEG2, MPEG4, H.264 and Window Media. Based on the disclosure and teachings provided herein, a person of ordinary skill in the art will know of other ways and/or methods to apply the present invention.

It should also be understood that the present invention can be implemented using software, hardware or a combination of both. Based on the disclosure and teachings provided herein, a person of ordinary skill in the art will know of other ways and/or methods to implement the present invention.

It is understood that the examples and embodiments described herein are for illustrative purposes only and that various modifications or changes in light thereof will be suggested to persons skilled in the art and are to be included within the spirit and purview of this application and scope of the appended claims. All publications, patents, and patent applications cited herein are hereby incorporated by reference for all purposes in their entirety.

What is claimed is:

1. A system for processing MPEG signals, comprising:
    an off-chip memory; and
    a processing module having an on-chip memory and a Digital Video/Audio Decoder, the processing module configured to:
        receive audio/video data from a plurality of channels and forward the data to the off-chip memory for storage, the audio/video data comprising a reference frame and one or more related frames;
        retrieve audio/video data for a channel from the off-chip memory when the audio/video data for the channel has reached a predetermined capacity;
        decode the reference frame retrieved from the off-chip memory to generate decoded audio/video data and information associated with the reference frame;
        store the decoded audio/video data and the information associated with the reference frame in the off-chip memory and some or all of the information associated with the reference frame in the on-chip memory, wherein the some or all of the information associated with the reference frame stored in the on-chip memory is used for subsequent decoding of the one or more related frames;
        retrieve the decoded audio/video data and information associated with the reference frame from the off-chip memory and encode the retrieved audio/video data; and
        forward the encoded audio/video data to a display device.

2. The system of claim 1 wherein the audio/video data for the channel includes at least an I-frame and a PBB frame sequence.

3. The system of claim 2 wherein the processing module is further configured to:
    decode the I-frame and generate corresponding decoded results and associated information; and
    forward the decoded results and associated information for the I-frame to the off-chip memory and forward some or all of the associated information for the I-frame to the on-chip memory;
    wherein the associated information for the I-frame stored in the on-chip memory are used to decode one or more frames in the PBB frame sequence.

4. The system of claim 3 wherein the processing module is further configured to:
    decode a P-frame in the PBB frame sequence using the associated information for the I-frame or a previous P-frame and generate corresponding decoded results and associated information; and
    forward the decoded results and associated information for the P-frame to the off-chip memory and forward some or all of the associated information for the P-frame to the on-chip memory;
    wherein the associated information for the P-frame stored in the on-chip memory are used to decode one or more frames in the PBB frame sequence.

5. The system of claim 4 wherein the processing module is further configured to:
    decode a B-frame in the PBB frame sequence using the associated information for the P-frame and/or the I-frame and generate corresponding decoded results and associated information; and
    forward the decoded results and associated information for the B-frame to the off-chip memory for storage.

6. The system of claim 1 wherein the processing module includes:
    a video transport engine configured to receive the audio/video data from the plurality of channels;
    a decoder configured to decode the audio/video data retrieved from the off-chip memory; and
    an encoder configured to encode the retrieved audio/video data from the off-chip memory.

7. The system of claim 1 wherein the audio/video data for the channel includes a fixed number of frames.

8. The system of claim 7 wherein before the processing module processes the fixed number of frames for the channel, information related to the reference frame that has been previously stored for that same channel is retrieved from the off-chip memory and then loaded into the on-chip memory.

9. The system of claim 8 wherein the processing module is further configured to recover one or more additional reference frames using the retrieved information related to the reference frame.

10. The system of claim 7 wherein before the processing module switches to another channel, information related to the reference frame is stored in the off-chip memory for reference purpose next time the same channel is to be processed.

11. The system of claim 1 wherein the processing module is built on an integrated circuit chip.

12. A set top box incorporating the system as recited in claim 1.

13. A system for processing MPEG signals, comprising:
an off-chip memory; and
a processing module having an on-chip memory, the processing module configured to:
receive MPEG data from a plurality of channels and forward the MPEG data to the off-chip memory for storage, the MPEG data comprising a plurality of groups of frames, wherein each group of frames comprises a reference frame and one or more related frames;
retrieve and decode one or more reference frames in the MPEG data corresponding to the plurality of channels on a channel-by-channel basis;
store decoded frame data and associated information corresponding to each of the one or more reference frames in the MPEG data in the off-chip memory;
store some or all of the associated information corresponding to the one or more reference frames of the plurality of channels in the on-chip memory, wherein the some or all of the associated information is used to facilitate decoding of the one or more related frames associated with the one or more reference frames in the MPEG data; and
retrieve the decoded data and associated information corresponding to the one or more reference frames from the off-chip memory and generate encoded results using the retrieved decoded data and associated information corresponding to the one or more reference frames, wherein the encoded results are suitable for use by an analog display device to generate corresponding images.

14. A set top box incorporating the system as recited in claim 13.

15. An MPEG processor comprising:
a video transport engine configured to receive MPEG data from a plurality of channels and forward the MPEG data to an off-chip memory for storage;
an on-chip memory;
control logic configured to retrieve audio/video data for a channel from the off-chip memory, the audio/video data including a reference frame and a frame related to the reference frame;
a decoder configured to decode the reference frame from the retrieved data and generate decoded data and associated information;
control logic configured to forward the decoded reference frame data and associated information to the off-chip memory and store some or all of the associated information in the on-chip memory; and
control logic configured to retrieve the some or all of the associated information stored in the on-chip memory and forward the some or all of the associated information to the decoder for use in subsequent decoding of the frame related to the reference frame.

16. The MPEG processor of claim 15 further comprising:
control logic configured to retrieve the decoded data and associated information from the off-chip memory; and
an encoder configured to generate encoded results using the decoded data and associated information retrieved from the off-chip memory;
wherein the encoded results are suitable for use by an analog display device.

17. The MPEG processor of claim 15 wherein the video transport engine includes:
a packet ID filter configured to filter the MPEG data and provide corresponding memory addresses to be used when storing the MPEG data onto the off-chip memory;
a transport stream processor configured to remove transport stream header and other system information from the filtered MPEG data received from the packer ID filter; and
an elementary stream pre-processor configured to receive output from the transport stream processor and identify headers in the output.

18. The MPEG processor of claim 17 wherein the decoder is further configured to decode multiple macro-blocks and/or slices in parallel using the identified headers.

19. The MPEG processor of claim 15 wherein the data for the channel includes at least an I-frame and a PBB frame sequence.

20. The MPEG processor of claim 19 wherein the decoder is further configured to:
decode the I-frame and generate corresponding decoded results and associated information; and
forward the decoded results and associated information for the I-frame to the off-chip memory and forward some or all of the associated information for the I-frame to the on-chip memory;
wherein the associated information for the I-frame stored in the on-chip memory are used to decode one or more frames in the PBB frame sequence.

21. The MPEG processor of claim 20 wherein the decoder is further configured to:
decode a P-frame in the PBB frame sequence using the associated information for the I-frame or a previous P-frame and generate corresponding decoded results and associated information; and
forward the decoded results and associated information for the P-frame to the off-chip memory and forward some or all of the associated information for the P-frame to the on-chip memory;
wherein the associated information for the P-frame stored in the on-chip memory are used to decode one or more frames in the PBB frame sequence.

22. The MPEG of claim 21 wherein the processing module is further configured to:
decode a B-frame in the PBB frame sequence using the associated information for the P-frame and/or the I-frame and generate corresponding decoded results and associated information; and
forward the decoded results and associated information for the B-frame to the off-chip memory for storage.

23. The MPEG processor of claim 15 wherein the data for the channel includes a fixed number of frames.

24. The MPEG processor of claim 23 wherein before the decoder processes the fixed number of frames for the channel, information related to a reference frame that has been previously stored for that same channel is retrieved from the off-chip memory and loaded into the on-chip memory.

25. The MPEG processor of claim 24 wherein the decoder is further configured to recover one or more additional reference frames using the retrieved information related to the reference frame.

26. The MPEG processor of claim 23 wherein before the decoder switches to another channel, information related to a reference frame is stored in the off-chip memory for reference purpose next time the same channel is to be processed.

27. The MPEG processor of claim 26 wherein the processing module is built on an integrated circuit chip.

28. A set top box incorporating the MPEG processor as recited in claim 15.

29. A system for processing MPEG signals, comprising:
an off-chip memory; and
a processing module having an on-chip memory, the processing module configured to:
receive MPEG data from a plurality of channels having at least first and second channels and forward the MPEG data to the off-chip memory for storage;
retrieve first MPEG data for the first channel, from the off-chip memory when the MPEG data for the first channel has reached a predetermined capacity;
decode the first MPEG data retrieved from the off-chip memory to obtain first decoded data;
store information associated with the first decoded data in the on-chip memory, wherein the information stored in the on-chip memory is to be used for subsequent decoding of MPEG data associated with the first channel;
retrieve second MPEG data for the second channel from the off-chip memory;
decode the second MPEG data to obtain a second decoded data;
store information associated with the second decoded data in the on-chip memory, wherein the information associated with the second decoded data is used for subsequent decoding of MPEG data associated with the second channel,
wherein the information associated with the first decoded data and the information associated with the second decoded data reside concurrently on the on-chip memory;
encode the first decoded data and the second decoded data; and
forward the encoded data to the off-chip memory for storage.

30. The system of claim 29 wherein the processing module is further configured to:
retrieve the encoded data from the off-chip memory; and
forward the retrieved encoded data to an analog display device.

31. The system of claim 29 wherein the data for the first channel and the second channel includes at least an I-frame and a PBB frame sequence.

32. The system of claim 31 wherein the processing module is further configured to:
decode the I-frame and generate corresponding decoded results and associated information; and
forward some or all of the associated information for the I-frame to the on-chip memory;
wherein the associated information for the I-frame stored in the on-chip memory are used to decode one or more frames in the PBB frame sequence.

33. The system of claim 32 wherein the processing module is further configured to:
decode a P-frame in the PBB frame sequence using the associated information for the I-frame or a previous P-frame and generate corresponding decoded results and associated information; and
forward some or all of the associated information for the P-frame to the on-chip memory;
wherein the associated information for the P-frame stored in the on-chip memory are used to decode one or more frames in the PBB frame sequence.

34. The system of claim 33 wherein the processing module is further configured to:
decode a B-frame in the PBB frame sequence using the associated information for the P-frame and/or the I-frame.

35. The system of claim 29 wherein the data for the first channel and the second channel includes a fixed number of frames.

36. The system of claim 35 wherein before the processing module processes the fixed number of frames for the first channel and the second channel, information related to a reference frame that has been previously stored for that same channel is retrieved from the off-chip memory and loaded into the on-chip memory.

37. The system of claim 36 wherein the processing module is further configured to recover one or more additional reference frames using the retrieved information related to the reference frame.

38. The system of claim 35 wherein before the processing module switches to another channel, information related to a reference frame is stored in the off-chip memory for reference purpose next time the same channel is to be processed.

39. The system of claim 29 wherein the processing module is built on an integrated circuit chip.

40. A set top box incorporating the system as recited in claim 29.

41. An MPEG processor comprising:
an on-chip memory;
a processing module configured to:
receive MPEG data from a plurality of channels having at least first and second channels and forward the MPEG data to an off-chip memory for storage;
retrieve, from the off-chip memory, first MPEG data corresponding to the first channel;
decode the first MPEG data retrieved from the off-chip memory to obtain first decoded data;
store, in the on-chip memory, information associated with the first decoded data, wherein the information stored in the on-chip memory is to be used for subsequent decoding of MPEG data associated with the first channel;
retrieve, from the off-chip memory, second MPEG data corresponding to the second channel;
decode the second MPEG data retrieved from the off-chip memory to obtain a second decoded data;
store, in the on-chip memory, information associated with the second decoded data, wherein the information stored in the on-chip memory is to be used for subsequent decoding of MPEG data associated with the second channel,
wherein the information associated with the first decoded data and the information associated with the second decoded data reside concurrently on the on-chip memory;
store the first decoded data and the second decoded data generated in the processing module in the off-chip memory;
retrieve the first decoded data and the second decoded data generated in the processing module from the off-chip memory; and encode the first decoded data and the second decoded data.

42. The MPEG processor of claim 41 wherein:
the data generated in the processing module that is stored in the off-chip memory is the decoded data; and
the data generated in the processing module that is retrieved from the off-chip memory is the decoded data; and
the decoded data that is encoded is the decoded data retrieved from the off-chip memory.

43. The MPEG processor of claim 42 wherein the processing module is further configured to forward the encoded data to a display device.

44. The MPEG processor of claim 41 wherein:
the decoded data that is encoded is the decoded data without the decoded data having been stored in the off-chip memory;
the data generated in the processing module that is stored in the off-chip memory is encoded data from the encoder; and
the data generated in the processing module that is retrieved from the off-chip memory is the encoded data.

45. The MPEG processor of claim 44 wherein the processing module is further configured to forward the encoded data to a display device.

46. The MPEG processor of claim 41 wherein the decoded data is encoded into a format that renders the encoded results suitable for use by an analog display device to generate corresponding images.

47. The MPEG processor of claim 41 wherein the first and the second MPEG data includes at least an I-frame and a PBB frame sequence.

48. The MPEG processor of claim 47 wherein the processing module is further configured to:
decode the I-frame and generate corresponding decoded results and associated information; and
forward the decoded results and associated information for the I-frame to the off-chip memory and forward some or all of the associated information for the I-frame to the on-chip memory;
wherein the associated information for the I-frame stored in the on-chip memory is used to decode one or more frames in the PBB frame sequence.

49. The MPEG processor of claim 48 wherein the processing module is further configured to:
decode a P-frame in the PBB frame sequence using the associated information for the I-frame or a previous P-frame and generate corresponding decoded results and associated information; and
forward the decoded results and associated information for the P-frame to the off-chip memory and forward some or all of the associated information for the P-frame to the on-chip memory;
wherein the MPEG processor information for the P-frame stored in the on-chip memory are used to decode one or more frames in the PBB frame sequence.

50. The MPEG processor of claim 49 wherein the processing module is further configured to:
decode a B-frame in the PBB frame sequence using the associated information for the P-frame and/or the I-frame and generate corresponding decoded results and associated information; and
forward the decoded results and associated information for the B-frame to the off-chip memory for storage.

51. The MPEG processor of claim 41 wherein the processing module includes:
a video transport engine configured to receive the MPEG data from the plurality of channels;
a decoder configured to decode the MPEG data retrieved from the off-chip memory on a channel-by-channel basis; and
an encoder configured to generate the encoded results using the retrieved decoded data and associated information.

52. The MPEG processor of claim 51 wherein the video transport engine includes:
a packet ID filter configured to filter the MPEG data and provide corresponding memory addresses to be used when storing the MPEG data onto the off-chip memory;
a transport stream processor configured to remove transport stream header and other system information from the filtered MPEG data received from the packer ID filter; and
an elementary stream pre-processor configured to receive output from the transport stream processor and identify headers in the output.

53. The MPEG processor of claim 52 wherein the decoder is further configured to decode multiple macro-blocks and/or slices in parallel using the identified headers.

54. The MPEG processor of claim 41 wherein the MPEG data for a channel to be processed includes a fixed number of frames.

55. The MPEG processor of claim 41 wherein before the processing module processes a fixed number of frames for the first channel and the second channel, information related to a reference frame that has been previously stored for that same channel is retrieved from the off-chip memory and loaded onto the on-chip memory.

56. The MPEG processor of claim 55 wherein the processing module is further configured to recover one or more additional reference frames using the retrieved information related to the reference frame.

57. The MPEG processor of claim 41 wherein before the processing module switches to another channel, information related to a reference frame is stored in the off-chip memory for reference purpose next time the same channel is to be processed.

58. The MPEG processor of claim 41 wherein the processing module is built on an integrated circuit chip.

59. A method carried out by a processing module for processing MPEG signals, the processing module having an on-chip memory, the method comprising:
receiving audio/video data from a plurality of channels and forwarding the audio/video data to an off-chip memory for storage, the audio/video data comprising one or more groups of frames, wherein each group of frames includes a reference frame and one or more frames related to the reference frames;
retrieving audio/video data for a channel from the off-chip memory when the audio/video data for the channel has reached a predetermined capacity;
decoding a first reference frame from the audio/video data for the channel retrieved from the off-chip memory;
storing information associated with the decoded first reference frame data in the on-chip memory, wherein the information stored in the on-chip memory is to be used for subsequent decoding of frames related to the first reference frame;
storing data generated in the processing module in the off-chip memory;
retrieving the data generated in the processing module from the off-chip memory; and
encoding decoded data.

60. The method of claim 59 wherein:

storing data generated in the processing module in the off-chip memory includes storing the decoded data in the off-chip memory; and retrieving the data generated in the processing module from the off-chip memory operates to retrieve the decoded data; and encoding decoded data operates to encode the decoded data retrieved from the off-chip memory.

61. The method of claim 60, and further comprising forwarding the encoded data to a display device.

62. The method of claim 59 wherein:

encoding decoded data into an alternative format operates to encode the decoded data without the decoded data having been stored in the off-chip memory;

storing data generated in the processing module in the off-chip memory includes storing encoded data; and retrieving the data generated in the processing module from the off-chip memory operates to retrieve the encoded data.

63. The method of claim 62, and further comprising forwarding the encoded data to a display device.

64. The method of claim 59 wherein encoding decoded data renders the encoded results suitable for use by an analog display device to generate corresponding images.

65. The method of claim 59 further comprising:

retrieving audio/video data for a second channel from the off-chip memory;

decoding a second reference frame from the audio/video data for the second channel; and storing information associated with the decoded second reference frame data in the on-chip memory, wherein the information stored on the on-chip memory is used for decoding subsequent frames related to the second reference frame.

* * * * *